No. 729,655. PATENTED JUNE 2, 1903.
C. A. PARSONS.
WINDING OF REVOLVING MAGNETS.
APPLICATION FILED OCT. 7, 1902.
NO MODEL. 11 SHEETS—SHEET 1.

No. 729,655. PATENTED JUNE 2, 1903.
C. A. PARSONS.
WINDING OF REVOLVING MAGNETS.
APPLICATION FILED OCT. 7, 1902.
NO MODEL. 11 SHEETS—SHEET 2.

Inventor.
Charles A. Parsons
by Ellis Spear
atty.

attest:

No. 729,655. PATENTED JUNE 2, 1903.
C. A. PARSONS.
WINDING OF REVOLVING MAGNETS.
APPLICATION FILED OCT. 7, 1902.
NO MODEL. 11 SHEETS—SHEET 3.

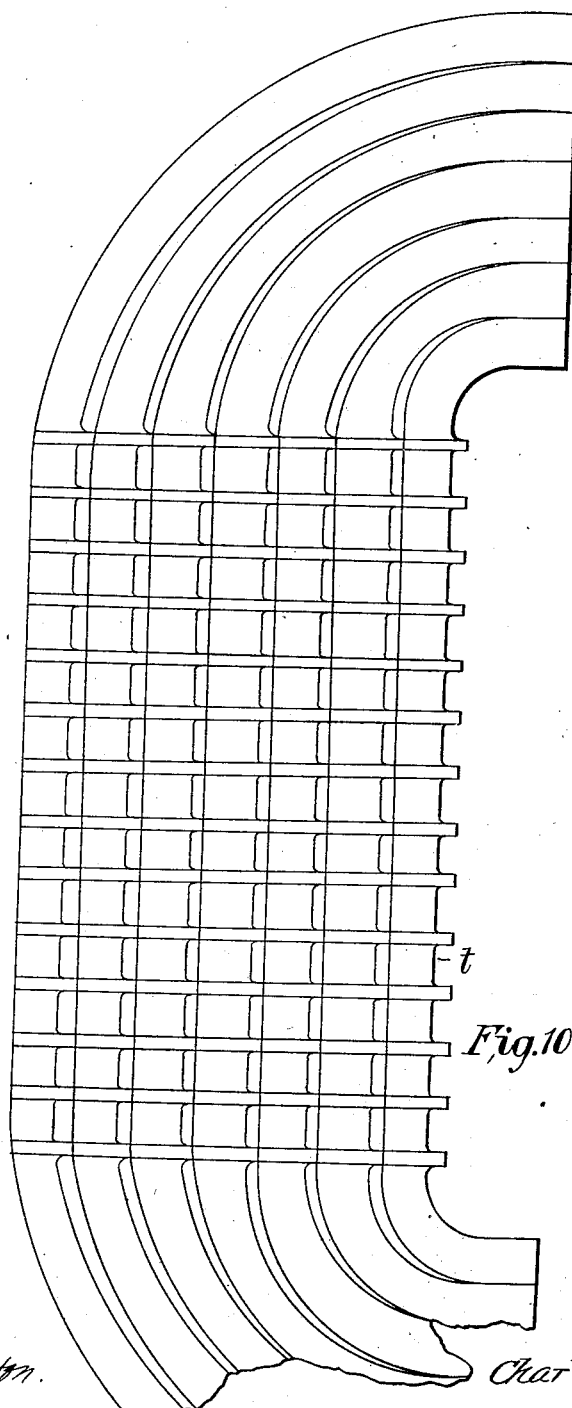

No. 729,655. PATENTED JUNE 2, 1903.
C. A. PARSONS.
WINDING OF REVOLVING MAGNETS.
APPLICATION FILED OCT. 7, 1902.
NO MODEL. 11 SHEETS—SHEET 9.

Inventor
Charles A. Parsons
by Ellis Spear
Atty.

Attest:
C. Middleton
Waller Donaldson

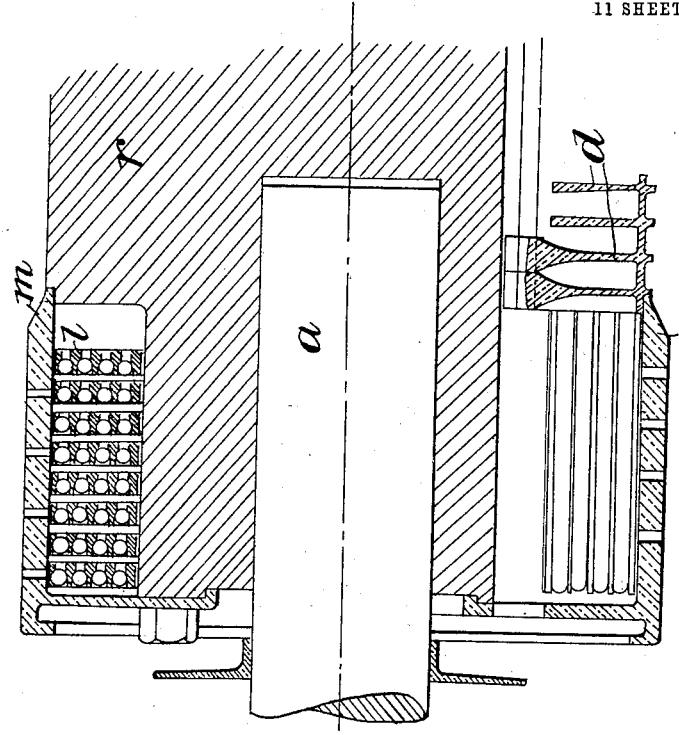
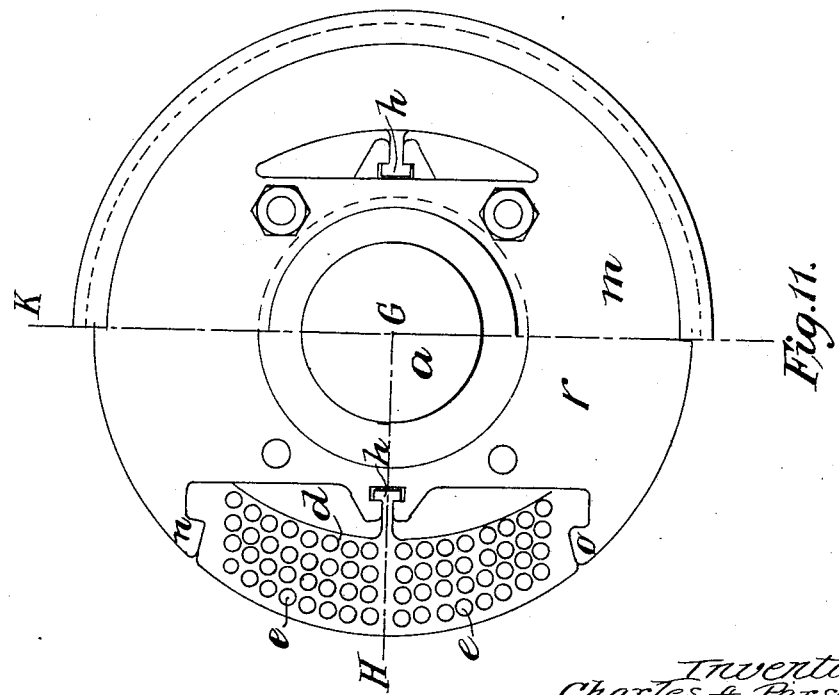

No. 729,655. PATENTED JUNE 2, 1903.
C. A. PARSONS.
WINDING OF REVOLVING MAGNETS.
APPLICATION FILED OCT. 7, 1902.
NO MODEL. 11 SHEETS—SHEET 11.
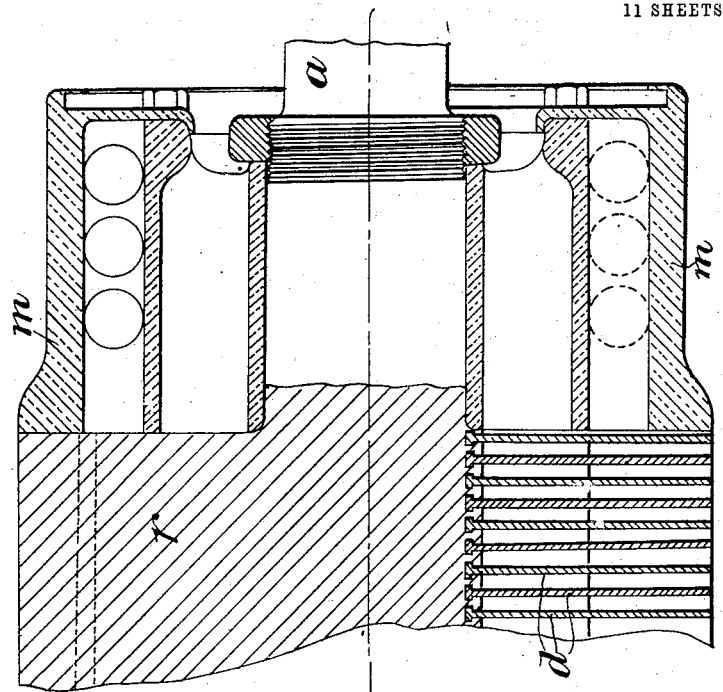
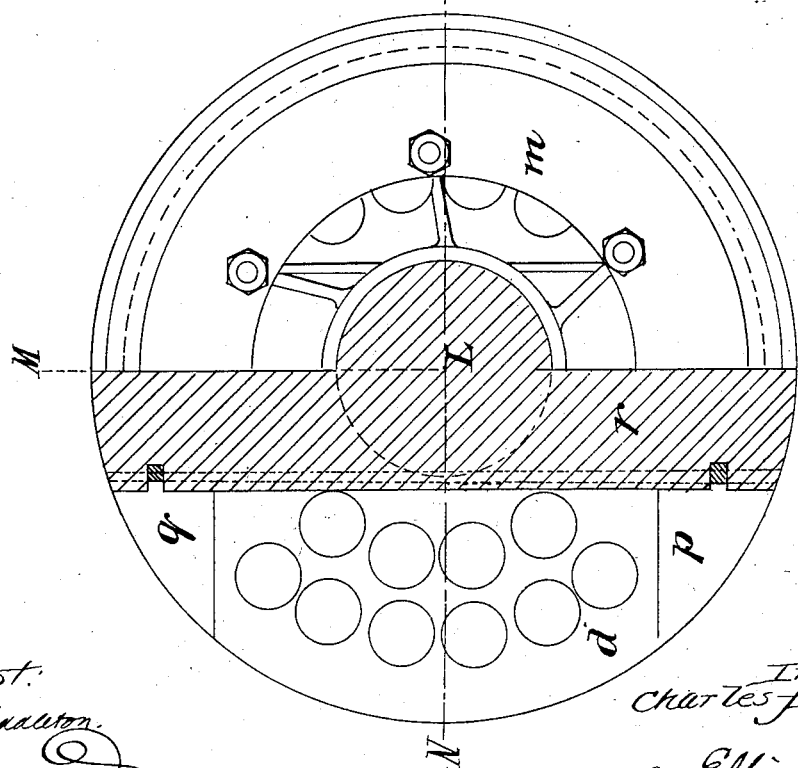
Attest:
C. Middleton
D. Walern Middleton
Inventor
Charles A. Parsons
by Ellis Spear
Atty No. 729,655.

Patented June 2, 1903.

UNITED STATES PATENT OFFICE.

CHARLES ALGERNON PARSONS, OF NEWCASTLE-UPON-TYNE, ENGLAND.

WINDING OF REVOLVING MAGNETS.

SPECIFICATION forming part of Letters Patent No. 729,655, dated June 2, 1903.

Application filed October 7, 1902. Serial No. 126,355. (No model.)

*To all whom it may concern:*

Be it known that I, CHARLES ALGERNON PARSONS, a subject of the King of Great Britain and Ireland, residing at Heaton Works, Newcastle-upon-Tyne, in the county of Northumberland, England, have invented certain new and useful Improvements in the Winding of Revolving Magnets, (for which I have made application for Letters Patent in Great Britain, No. 5,907, bearing date March 10, 1902,) of which the following is a specification.

My invention relates to the construction and winding of revolving magnets, and more especially to those that revolve at high angular velocities and are driven by steam-turbines or other high-speed motors, such as Pelton wheels, water-turbines, or electric-motors. In such cases the centrifugal force is so great that the ordinary construction of magnet-coils wound on the poles of revolving magnets is difficult or impracticable.

My invention consists in constructing a revolving field-magnet adapted with its windings to withstand centrifugal forces of great magnitude; also by its construction to secure a great amount of subdivision of the magnet-windings and a large amount of surface of the conductor exposed for air cooling, so as to permit of very high current densities in the magnet-coils and a much greater output from the dynamo in proportion to its size, weight, and cost of material than has hitherto been possible.

The accompanying drawings illustrate some froms in which my invention may be carried into effect.

Figure 1:
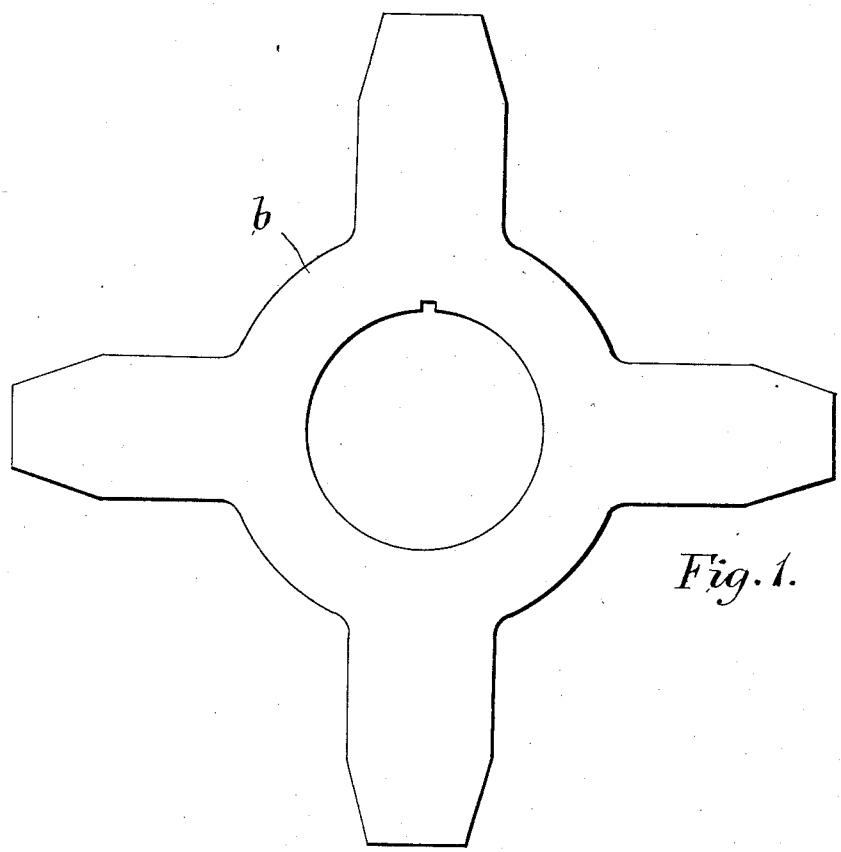
Figures 5, 6:
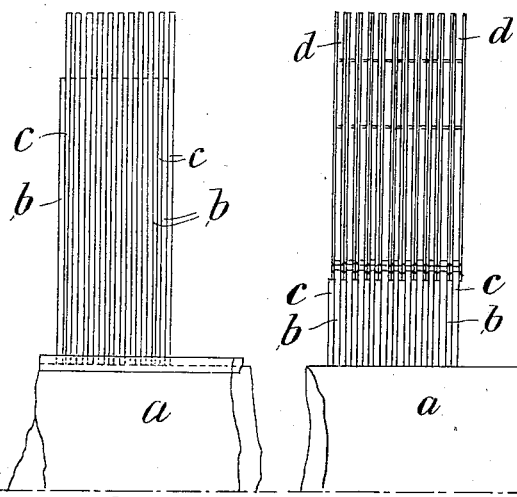
Figure 3:
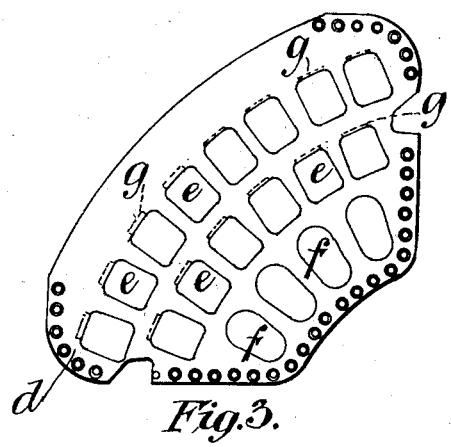
Figure 2:
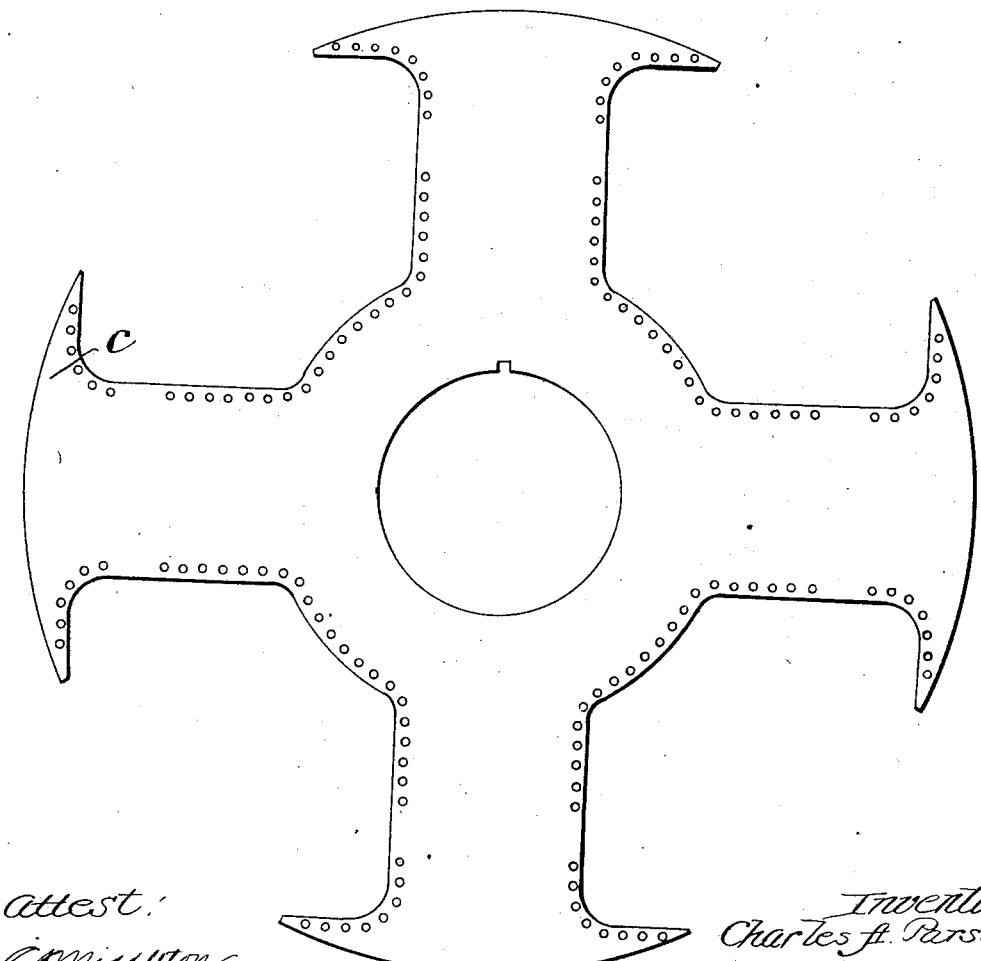
Figure 4:
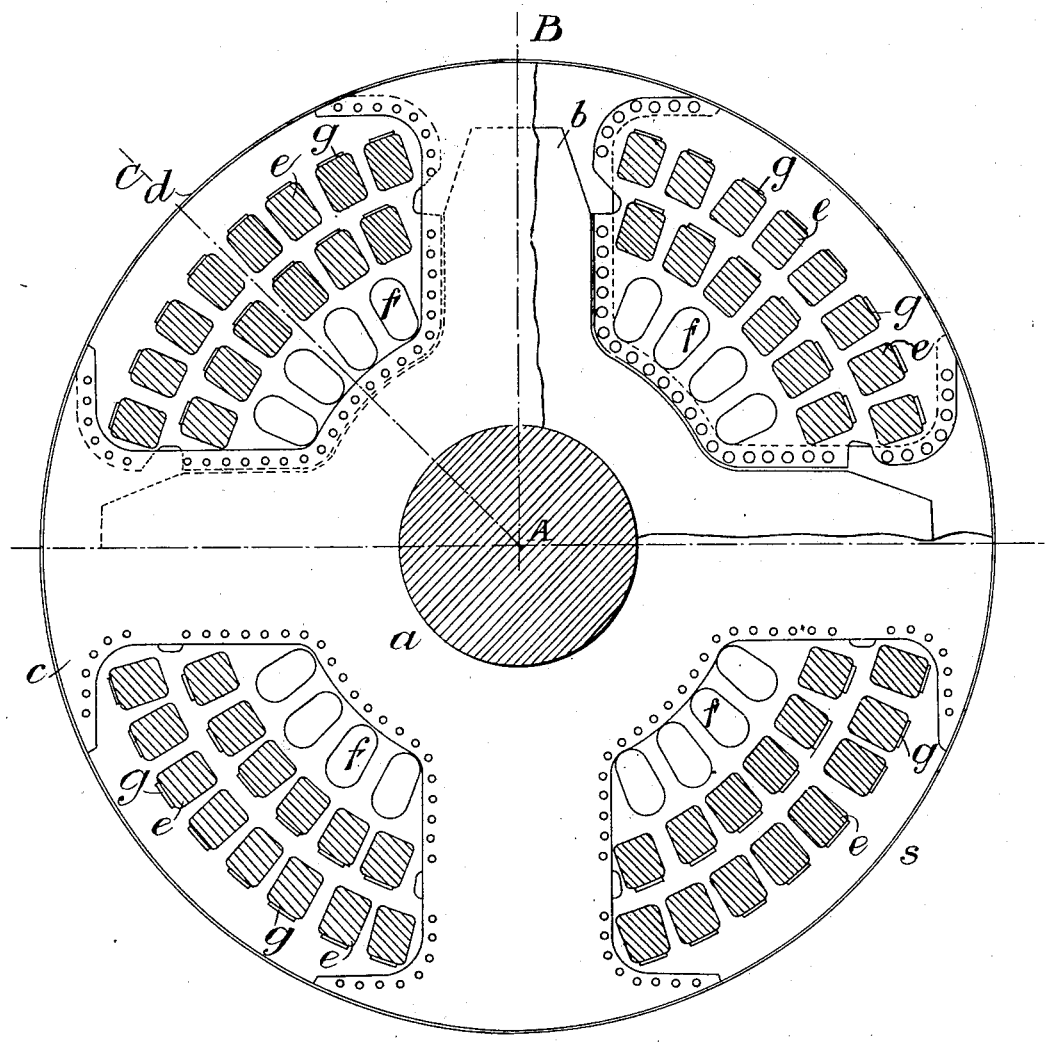
Figure 7:
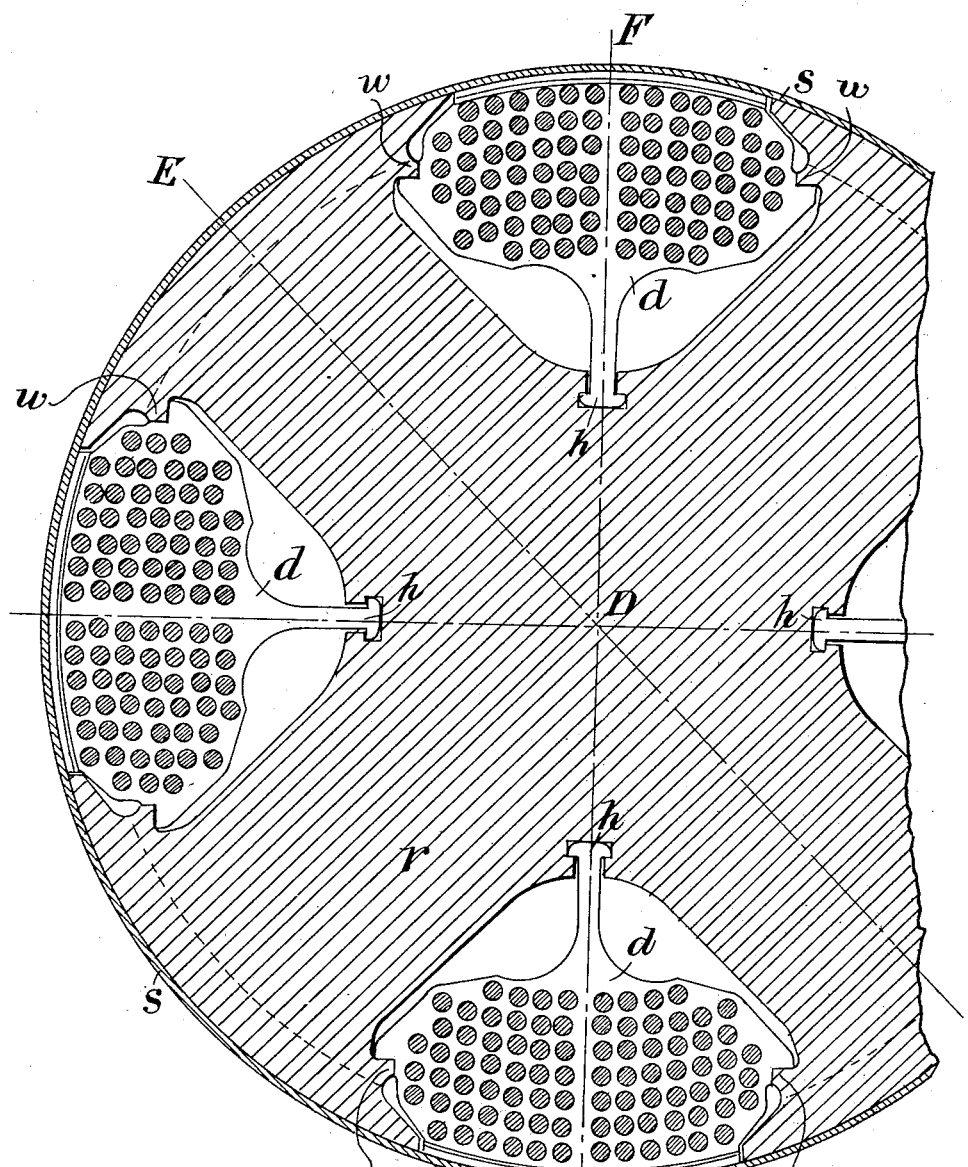
Figure 8:
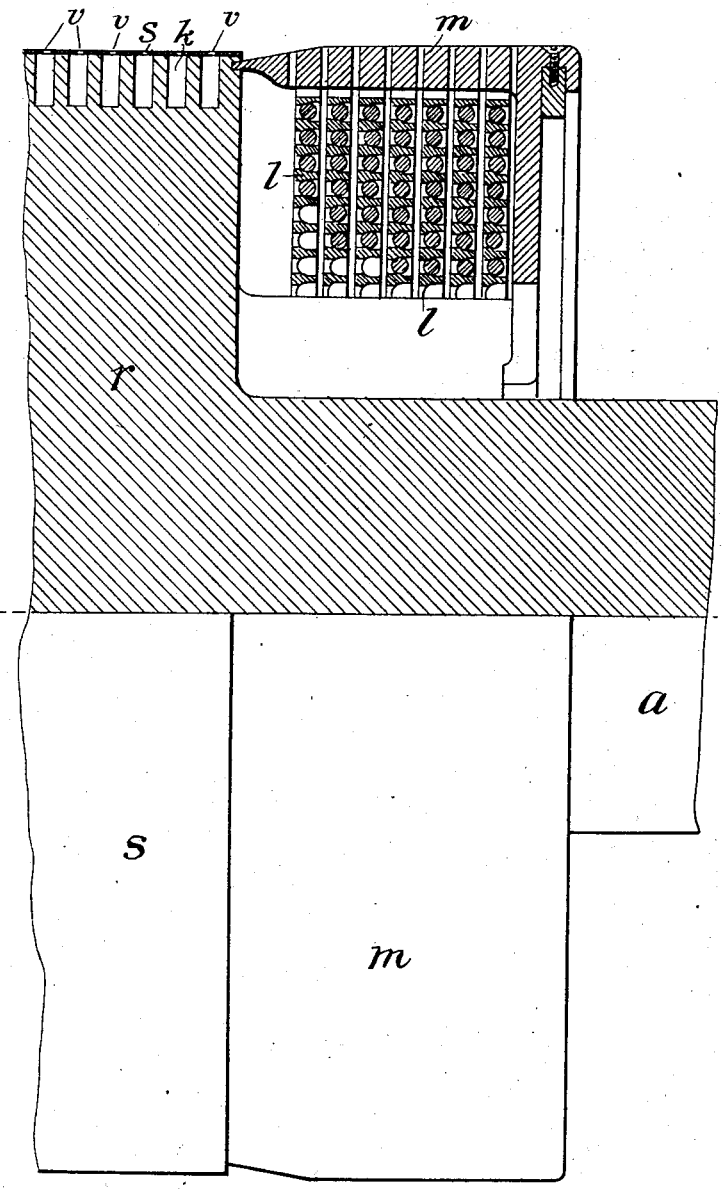
Figure 9:
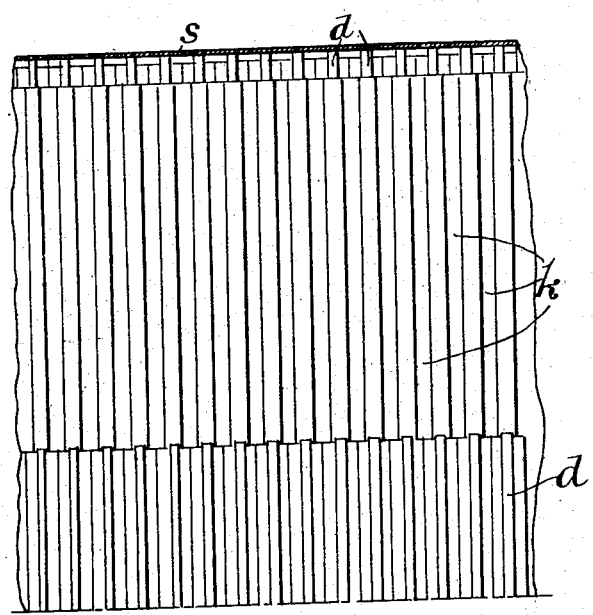
Figure 10:
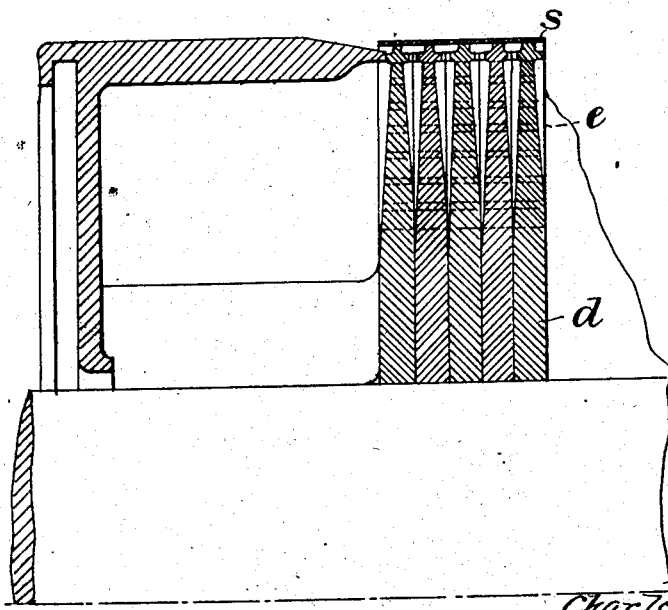
Figure 10A:
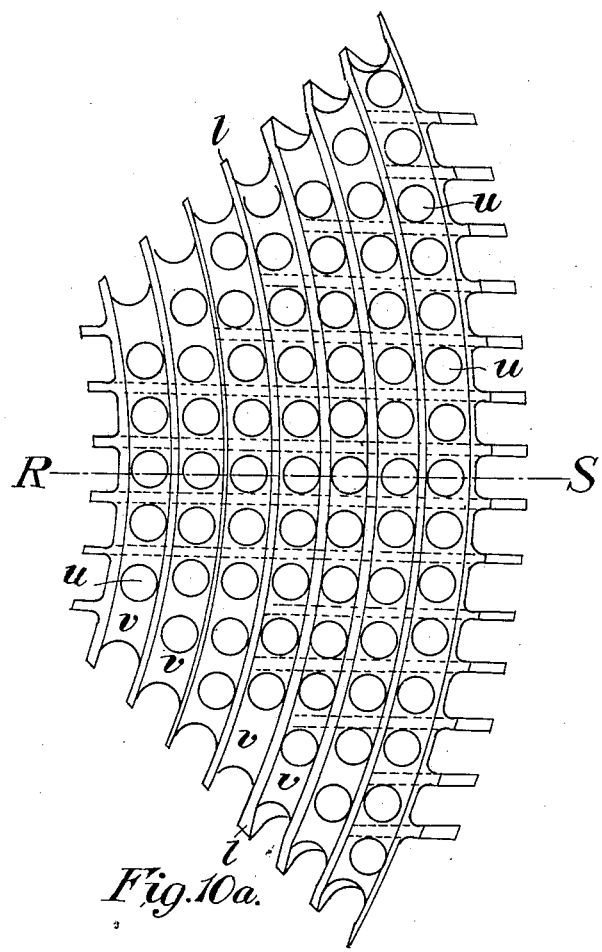
Figure 10B:
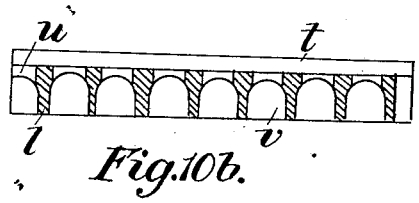
Figure 10:
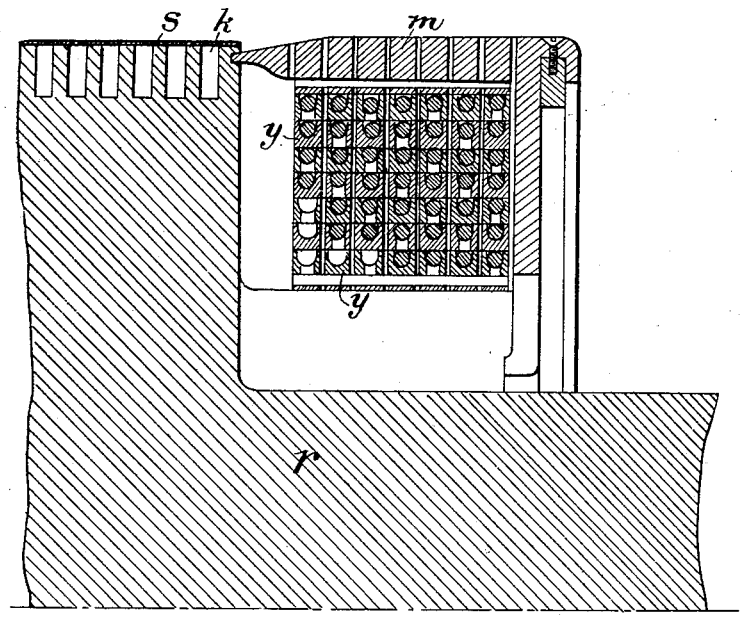
Figure 10:
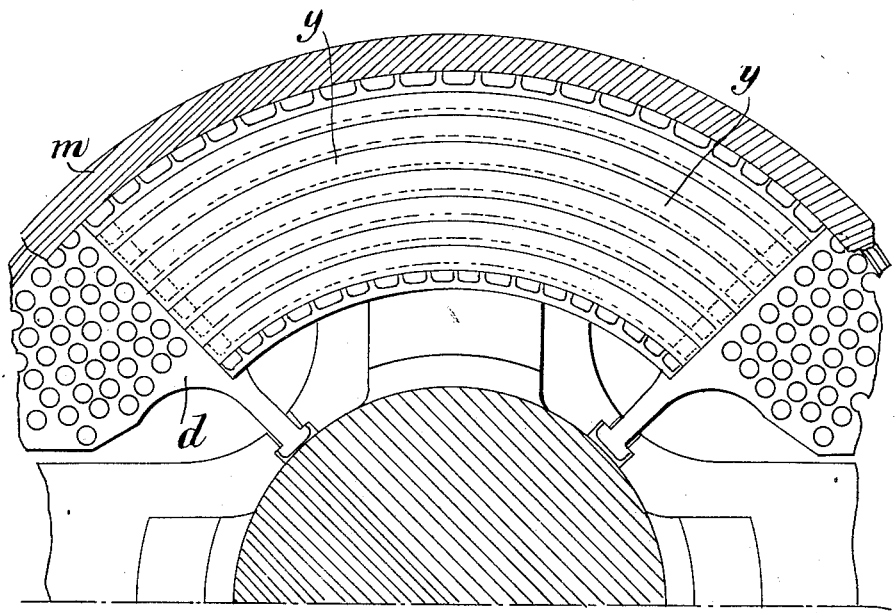

Figures 1 and 2 show the shape of the plates used in a laminated field-magnet with four poles. Fig. 3 is a plate for carrying the windings between the poles of the magnet. Fig. 4 is a section through a built field-magnet. Fig. 5 is a longitudinal section on line A B, Fig. 4. Fig. 6 is a longitudinal section on line A C, Fig. 4. Fig. 7 is a section through a field-magnet made with a solid core. Fig. 8 is a view of the end of the field-magnet shown in Fig. 7, partly in outside elevation and partly in section on line D E, Fig. 7. Fig. 9 is an elevation of part of the body of field-magnet shown in Fig. 7 with part of the outside sheath removed. Fig. 10 is a longitudinal section of the end of field-magnet shown in Fig. 7 on the line D F. Fig. $10^a$ is a front view of one of the quadrant-shaped slabs carrying the end windings. Fig. $10^b$ is a section of Fig. $10^a$ on the line R S. Fig. $10^c$ is a developed top view of a group of slabs as in Fig. $10^a$. Fig. $10^d$ is a section of an arrangement somewhat different from that shown in Fig. 8. Fig. $10^e$ is a part of an end view of Fig. $10^d$ with back part of cap removed. Fig. 11 is an end view of a two-poled field-magnet with the end cap removed from one half. Fig. 12 is a longitudinal section of Fig. 11, partly on line G K and partly on line G H. Fig. 13 is the end view of another form of two-poled revolving field-magnet, the end cap being half removed. Fig. 14 is a longitudinal section of Fig. 13, partly on line L M and partly on line L N.

In carrying my invention into effect according to the form illustrated in Figs. 1 to 6 I construct the revolving magnets of thin plates of iron or other suitable material strung on a shaft $a$. These plates may be star-shaped or of any other convenient shape, with or without extended pole-pieces. In the form illustrated in Figs. 1 to 6 the magnet is made up of two sets of plates $b$ and $c$, arranged alternately and shaped as shown in Figs. 1 and 2. To the plates $c$ are riveted or otherwise secured plates $d$, (shown separately in Fig. 3,) of brass, delta metal, or other non-magnetic material. These plates $d$ are perforated by a number of holes $e\ e$ of suitable shape to carry the windings around the poles. They may also be perforated with holes $f$ for ventilation purposes. If the magnet be arranged with four poles, as in the example illustrated, then four sets of these plates $d$ are necessary and are so disposed as to bridge over the gap between each pair of poles of the magnet. The plates $d$ may be disposed one on each side of the plates $c$, as shown in Fig. 6, or on one side only. The spaces left between the plates when these compound plates are strung on the shaft may be left vacant or may be filled with suitably-shaped plates of iron or other material, magnetic or non-magnetic, secured or not to the former plates. The perforations $e$ in the the plates $d$ may be bushed or flanged, as shown at $g$, Fig.

4, so as to reduce the local pressure on the winding and its insulation due to the great centrifugal force.

Instead of having the magnet laminated I sometimes construct it of a single steel casting or soft-iron forging, as shown in the form of my invention illustrated in Figs. 7 to 10. In this case the perforated plates $d$ are made with T-headed tongues $h$ attached to them, which fit into similarly-shaped grooves milled or otherwise formed in the body $r$ of the magnet between the poles and preferably running parallel to the shaft. The edges of the perforated plates may be engaged with the side faces of the pole-pieces in any suitable manner, as shown at $w$, Fig. 7. The pole-faces may be left solid; but I prefer to machine grooves $k$, Fig. 8, in them or to fix to them by dovetails, screws, or other suitable means laminated iron shoe-pieces to prevent eddy-currents in the polar faces. Where the windings of the magnets leave the plates at the ends, they are retained in their respective places by plates or slabs $l$, of aluminium, brass, or other suitable material, one of which is shown in Figs. $10^a$ and $10^b$ and $y$ in Figs. $10^d$ and $10^e$. These slabs may be furrowed on one or both faces, the furrow $t$ on the back forming air-passages, while the curved grooves $v$ on the face carry the windings. Holes $u$ may be made in these slabs to permit a current of air to circulate around each conductor or group of conductors. Other slabs $y$, of cylindrical or drum form suitably drilled and furrowed, as shown in Figs. $10^d$ and $10^e$, may be used instead of the slabs $l$, so constructed that the whole end forms a wind-cage and provides the maximum possible amount of cooling over the end windings. These slabs are held in position by massive caps $m$, of steel, manganese bronze, or other suitable material, or in some cases by binding-wire. The caps are preferably perforated to allow of ventilation.

Figs. 11 to 14 show my invention as applied to a two-poled magnet. In this case only two sets of the perforated plates $d$ are necessary, and these may be secured by the T-headed tongue $h$, held in the groove milled in the magnet, and the projections $n$ and $o$, bearing against the sides of the pole-pieces, as illustrated in Fig. 11, or, as is sometimes preferable in bipolar magnets, they may be held by means of dovetails or other suitable arrangement in transverse slots cut in the body of the magnet and prevented from sliding endwise by two strips $p$ and $q$, of iron or other suitable material, fixed to the body of the magnet, as illustrated in Fig. 13.

If it is desired to reduce the noise while running, a shield formed of a tube $s$, Figs. 4, 7, 8, and 10, of suitable material, may be placed over the whole magnet in any of the above-described forms. This tube may be perforated (as shown at $r$, Fig. 8) or not for ventilation, as desired.

It is obvious that this invention may be applied to field-magnets having any number of poles.

Having now described my invention, what I claim as new, and desire to secure by Letters Patent, is—

1. In dynamo-electric machines having revolving field-magnets, bridge-pieces of non-magnetic material fitted between the poles of the magnet to carry the windings, said bridge-pieces being perforated with holes suitable for the winding to pass through and having further perforations for the purpose of ventilation.

2. In dynamo-electric machines having revolving field-magnets, perforated bridge-pieces of non-magnetic material fitted between the poles of the magnet to carry the windings, grooved slabs of non-magnetic material to carry the end windings and means for retaining said slabs in position.

3. In dynamo-electric machines having revolving field-magnets, perforated bridge-pieces of non-magnetic material fitted between the poles of the magnet to carry the windings, grooved slabs of non-magnetic material to carry the end windings and strong caps fitted on to the ends of the field-magnets to keep said grooved slabs and end windings in position.

4. In a dynamo-electric machine the combination with a revolving field-magnet of perforated non-magnetic bridge-pieces carrying the windings between the pole-pieces, non-magnetic grooved slabs carrying the end windings, caps fitted on the ends of the field-magnets to keep said grooved slabs and end windings in position and a thin tubular sheath covering the body of the field-magnet.

5. In a dynamo-electric machine the combination with a revolving field-magnet of perforated non-magnetic bridge-pieces carrying the windings between the pole-pieces, non-magnetic grooved slabs carrying the end windings, caps fitted on the ends of the field-magnets to keep said grooved slabs and end windings in position and a thin tubular sheath covering the body of the field-magnet said end cap and sheath being perforated with holes to allow of ventilation.

In witness whereof I have hereunto set my hand in presence of two witnesses.

CHARLES ALGERNON PARSONS.

Witnesses:
HENRY GRAHAM DAKYNS, Jr.,
WILLIAM DAGGETT.